United States Patent
Lunttila et al.

(10) Patent No.: US 9,380,592 B2
(45) Date of Patent: Jun. 28, 2016

(54) MECHANISM FOR PROVIDING CHANNEL FEEDBACK IN MULTI-CELL COMMUNICATION

(75) Inventors: Timo Erkki Lunttila, Espoo (FI); Klaus Ingemann Pedersen, Aalborg (DK)

(73) Assignee: Nokia Solutions and Networks Oy, Espoo (FI)

(*) Notice: Subject to any disclaimer, the term of this patent is extended or adjusted under 35 U.S.C. 154(b) by 518 days.

(21) Appl. No.: 13/993,352

(22) PCT Filed: Dec. 13, 2010

(86) PCT No.: PCT/EP2010/069437
§ 371 (c)(1),
(2), (4) Date: Jun. 12, 2013

(87) PCT Pub. No.: WO2012/079615
PCT Pub. Date: Jun. 21, 2012

(65) Prior Publication Data
US 2013/0273931 A1    Oct. 17, 2013

(51) Int. Cl.
*H04W 72/08* (2009.01)
*H04W 24/10* (2009.01)
*H04W 24/08* (2009.01)

(52) U.S. Cl.
CPC ........... *H04W 72/085* (2013.01); *H04W 24/10* (2013.01); *H04W 24/08* (2013.01)

(58) Field of Classification Search
CPC ... H04W 72/085; H04W 88/02; H04W 72/08; H04W 72/04; H04W 72/00; H04L 12/26
USPC ........ 370/252, 329, 345; 455/447, 452.2, 501
See application file for complete search history.

(56) References Cited

U.S. PATENT DOCUMENTS

| | | | | |
|---|---|---|---|---|
| 2010/0118817 A1* | 5/2010 | Damnjanovic | ........ | H04L 1/0026 370/329 |
| 2010/0173660 A1* | 7/2010 | Liu | ........ | H04W 24/02 455/501 |
| 2010/0271968 A1 | 10/2010 | Liu et al. | | ........ 370/252 |

FOREIGN PATENT DOCUMENTS

| CN | 101789813 A | 7/2010 |
|---|---|---|
| WO | WO 2010/081166 A2 | 7/2010 |

OTHER PUBLICATIONS

3GPP TSG RAN WG1 Meeting #58, Shenzhen, China, Aug. 24-Aug. 28, 2009; CoMP Implicit CQI Feedback Discussions; R1-093383, 6 pgs.

(Continued)

*Primary Examiner* — Charles C Jiang
*Assistant Examiner* — Wali Butt
(74) *Attorney, Agent, or Firm* — Harrington & Smith

(57) ABSTRACT

There is proposed a mechanism allowing a compressed multi-cell channel state information feedback. In a user equipment communicating with plural base stations such as eNBs, a joint set of communication subbands is identified which includes those subbands which provide a specific communication quality level, and which are common to at least two of the plural cells. Then, a status report is generated and transmitted to the control nodes of each of the plural cells. The status report includes an information regarding the joint set of communication subbands, cell specific information including quality indicators for each cell of the plurality of cells related to a transmission using the subbands of the respective cell included in the joint set of communication subbands and quality indicators for each cell of the plurality of cells related to a transmission using all subbands of the respective cell, and joint information concerning a joint quality indicator related to a transmission using all cells.

20 Claims, 4 Drawing Sheets

(56) References Cited

OTHER PUBLICATIONS

3GPP TSG RAN WG1 Meeting #57, San Francisco, USA, May 4-8, 2009; Potential gain of DL CoMP with joint transmission; R1-091688, 5 pgs.

3GPP TSG-RAN WG2 Meeting #66, San Francisco, USA, May 4-8, 2009; CoMP Cell Set Configuration; R2-093075, 5 pgs.

3GPP TS 36.213 V9.3.0 (Sep. 2010); 3rd Generation Partnership Project; Technical Specification Group Radio Access Network; Evolved Universal Terrestrial Radio Access (E-UTRA); Physical layer procedures (Release 9); 80 pgs.

* cited by examiner

MECHANISM FOR PROVIDING CHANNEL FEEDBACK IN MULTI-CELL COMMUNICATION

BACKGROUND OF THE INVENTION

1. Field of the Invention

The present invention relates to a mechanism usable for providing a channel feedback in a multi-cell communication scenario. In particular, the present invention is related to a method, apparatus and computer program product providing a mechanism allowing a compressed multi-cell channel state information feedback.

2. Related Background Art

Prior art which is related to this technical field can e.g. be found by the technical specification 3GPP TS 36.213, v.9.3.0.

The following meanings for the abbreviations used in this specification apply:
3GPP—3rd generation partnership project
BLER—block error rate
CoMP—coordinated multi-point (transmission or reception)
CQI—channel quality indicator
CRC—cyclic redundancy check
CSI—channel state information
CSI-RS—channel state information reference symbols
DL—downlink
eNB—enhanced Node B (LTE based base transceiver station)
FDPS—frequency domain packet scheduling
IP—Internet protocol
LTE—long term evolution
MCS—modulation and coding scheme
MIMO—multiple input multiple output
PMI—precoding matrix indicator
PRB—physical resource block
RI—rank indicator
RS—reference symbol
SINR—signal to interference noise ratio
TBS—transport block size
TX—transmission
UE—user equipment
UL—uplink In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) communication networks like the Universal Mobile Telecommunications System (UMTS), enhanced communication networks based e.g. on LTE, cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN) or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

A next step or evolution in LTE based systems will be so-called LTE-Advanced which shall fulfill further requirements. One of the study items is coordinated multi-point transmission/reception or CoMP.

Generally, for properly establishing and handling a communication connection between network elements such as a UE and another communication equipment, such as another UE, a server, etc., one or more intermediate network elements, such as base stations or access nodes, network control nodes, support nodes, service nodes and interworking elements are involved which may belong to different communication networks.

In a CoMP scenario, the situation is further enhanced. For example, CoMP a method of transmitting to or receiving from a UE using several base stations. The general goal is to improve data throughput. Basically, in a CoMP communication scenario, inter-cell interferences are tried to be turned into useful signal, especially at a cell border where performance may be degraded. While high data rates are relatively easy to maintain close to a base station, when distances increase, they become more difficult to maintain. Not only is the signal lower in strength because of the distance from the base station such as an eNB, but also interference levels from neighboring eNBs are likely to be higher as the UE will be closer to them.

Therefore, it is intended in a CoMP scenario that a close coordination between a number of geographically separated eNBs is achieved. The eNBs may dynamically coordinate to provide joint scheduling and transmissions as well as proving joint processing of the received signals. In this way a UE at the edge of a cell is able to be served by two or more eNBs to improve signals reception/transmission and increase throughput particularly under cell edge conditions.

In essence, CoMP may provide two modes of operation:
Joint simultaneous transmission of user data from multiple eNBs to a single UE
Dynamic cell selection with data transmission from one eNB.

To achieve either of these modes, highly detailed feedback is required, for example on channel properties, in a fast manner so that necessary changes can be made. In other words, in order to make CoMP possible, it is necessary to provide, for example, an accurate Chanel State Information (CSI) Feedback which is sent from the UE to the (plural) eNB(s).

In order to achieve gains from techniques for improving the system capacity, such a frequency dependent packet scheduling (FDPS), it is necessary to obtain accurate information about a propagation channel, such as frequency domain behavior of the propagation channel. For example, for enabling use of FDPS, several frequency selective CSI reporting modes are proposed and also included in specifications of e.g. LTE.

However, the size of CSI reports depends on several elements, such as the used reporting mode, a system bandwidth and a rank. For example, in existing solutions considering a connection between one UE and one eNB (i.e. a non-CoMP case), the maximum size of a CSI report may be 64 bits (as so-called reporting mode 3-1, bandwidth is 20 MHz, rank>1), without CRC bits.

As indicated above, when a communication scenario using CoMP is established, e.g. a DL CoMP operation, a UE is simultaneously connected to multiple eNBs. When sufficient and accurate CSI reports are available, the cooperating eNBs are able to e.g. select optimal precoders and frequency resources for data transmission (as in coordinated scheduling/beamforming) or perform joint transmission to the UE simultaneously from multiple points. However, in order to achieve this, all CoMP schemes requires such accurate CSI reports for all the cooperating cells, on which basis the eNBs can then conduct a communication control and choose how and which of the different cells interact.

In order to provide such sufficient and accurate CSI reports, there are conceivable several options. One straight forward option would be to simply provide separate frequency selective CSI reports for each of the cooperating cells, i.e. to treat every cell connection in the CoMP scenario as if it is the only connected cell. However, in such a case, the resulting procedure is typically not feasible, for example since report sizes would probably become excessive. For example, assuming a case where three cells with 4 TX antennas each are communicating with an UE. When using, for example, a report mode 3-1, a resulting CSI reporting would require transmission of 3*64 bits=192 bits (excluding the additional CRC bits) which represents a rather high overhead.

For example, a corresponding CSI reporting mode which is already discussed in the LTE related specifications, such as in LTE Release-8, is the so-called Mode 2-2, also known as Best-M average. In this Mode 2-2 the UE connected to one eNB reports:

One CQI value for each codeword reflecting the transmission over the M best subbands (a group of consecutive PRBs, M>0), which has a size of e.g. 4+2 bits One precoding matrix preferred for the M selected subbands, which has a size of e.g. 4 bits for cells with 4 TX antennas One precoding matrix preferred for all the subbands, which has a size of e.g. 4 bits for cells with 4 TX antennas One CQI value for each codeword reflecting the transmission on all the subbands, which has a size of e.g. 4+2 bits An indication of the M preferred subbands, which may have a size of 18 bits for a 20 MHZ system bandwidth Additionally, the UE may also report a separately encoded RI.

In summary, when a system configuration with an eNB having 4 TX antennas and a 20 MHz system bandwidth is assumed, a resulting payload size of a report based on the CSI reporting Mode 2-2 is 38 bits. However, as indicated above, when such an aperiodic CSI Mode 2-2 is used in case of a CoMP scenario with more than one eNB to be measured and reported to, the payload size becomes large, for example 3*38 bits with three cells. However, since UEs using CoMP may be typically close to a cell border and are hence often UL coverage limited, payload is a critical issue. Furthermore, the CSI reporting Mode 2-2 as discussed in the existing LTE specifications and described above is not really suitable for a multi-cell operation such as CoMP. The reason is that typically the best-M subbands the UE identifies are not the same for different cells which complicates a processing of an eNB scheduler to figure out which part of the spectrum is to allocate to the reporting UE.

As another option, it is also possible to just rely on a wideband feedback, i.e. a frequency non-selective feedback for CoMP. This option would have the advantage of producing only a small overhead, for example 11 bit/cell or less. However, this option is also not optimal since in such a case it would not be possible to achieve certain benefits of capacity improving techniques such as FDPS, which may be in a range of approximately 40% in throughput, depending on the conditions.

SUMMARY OF THE INVENTION

It is an object of the invention to provide an apparatus, method and computer program product by means of which an improved channel state feedback in a multi-cell operation is possible. Specifically, it is an object of the present invention to provide an apparatus, method and computer program product which enables an improved multi-cell feedback required for e.g. CoMP so that sufficient and accurate CSI information can be sent to an eNB for allowing a proper CoMP processing without producing too much overhead or payload in the UL direction.

These objects are achieved by the measures defined in the attached claims.

According to an example of the proposed solution, there is provided, for example, an apparatus comprising a first processor configured to identify a joint set of communication subbands of a plurality of cells with which a user equipment can communicate, wherein the joint set of communication subbands includes those subbands which provide a specific communication quality level, and which are common to at least two of the plurality of cells, and a second processor configured to generate a status report and initiate a transmission of the status report to control nodes of each of the plurality of cells, wherein the status report comprises an information regarding the joint set of communication subbands, and at least one of cell specific information comprising a first quality indicator for each cell of the plurality of cells related to a transmission using the subbands of the respective cell included in the joint set of communication subbands, and a second quality indicator for each cell of the plurality of cells related to a transmission using all subbands of the respective cell, and/or joint information comprising a joint quality indicator related to a transmission using all cells.

Furthermore, according to an example of the proposed solution, there is provided, for example, a method comprising identifying a joint set of communication subbands of a plurality of cells with which a user equipment can communicate, wherein the joint set of communication subbands includes those subbands which provide a specific communication quality level, and which are common to at least two of the plurality of cells, and generate a status report, wherein the status report comprises an information regarding the joint set of communication subbands, and at least one of cell specific information comprising a first quality indicator for each cell of the plurality of cells related to a transmission using the subbands of the respective cell included in the joint set of communication subbands, and a second quality indicator for each cell of the plurality of cells related to a transmission using all subbands of the respective cell, and/or joint information comprising a joint quality indicator related to a transmission using all cells, and initiating a transmission of the status report to control nodes of each of the plurality of cells.

According to further refinements, there may be comprised one or more of the following features:

in the identification of the joint set of communication subbands of the plurality of cells with which the user equipment can communicate, in each subband of each of the plurality of cells at least one transmission quality parameter may be detected, and on the basis of the detected transmission quality parameter those subbands which provide the specific communication quality level may be determined;

the specific communication quality level may be based on at least one of a predetermined number M of subbands from all subbands of the plurality of cells, wherein M>0, providing the relatively best communication quality level compared to the remaining subbands, and/or those subbands of all subbands of the plurality of subbands providing a specific minimum communication quality level.

for the generation of the status report, for the cell specific information and/or the joint information, a channel quality indication for a first codeword and a delta channel quality indication for a second codeword may be determined, or a channel quality indicator for each of a first and second codeword may be determined;

for the generation of the status report, at least one of the following parameters may be determined and included in the status report: a first precoding matrix indication for each cell of the plurality of cells related to a transmission using the subbands of the respective cell included in the joint set of communication subbands, a second precoding matrix indication for each cell of the plurality of cells related to a transmission using all subbands of the respective cell, a third precoding matrix indication considering a joint transmission from all cells, a rank indicator for each cooperating cell, and a rank indicator considering a joint transmission from all cells;

in the generation of the status report, as the information regarding the joint set of communication subbands, one of a joint bitmap, a label or a combinatorial index indicating the subbands included in the joint set of communication subbands may be included;

the mechanism may be implemented in a user equipment configured to communicate with each of the plurality of cells.

Furthermore, according to examples of the proposed solution, there is provided, for example, a computer program product for a computer, comprising software code portions for performing the steps of the above defined methods, when said product is run on the computer. The computer program product may comprise a computer-readable medium on which said software code portions are stored. Furthermore, the computer program product may be directly loadable into the internal memory of the computer and/or transmittable via a network by means of at least one of upload, download and push procedures.

By virtue of the proposed solutions, it is possible to provide an apparatus, method and computer program product which allow to perform a compression of a report to be sent to an eNB for allowing a proper CoMP processing without producing too much overhead or payload in the UL direction. Thus, a CSI reporting mode can be provided which is more suitable to the context of multi-cell feedback required for CoMP than existing ones. Hence, a very efficient way of providing frequency selective feedback for CoMP with minimized UL overhead can be achieved.

Furthermore, in addition to the maintenance of a good UL coverage and a low UL overhead for CSI reporting or the like, the advantages of capacity improving techniques like FDPS can be kept.

Moreover, the implementation of a mechanism as proposed in the present solution would require only a low standardization effort, since existing procedures and methods can be maintained when implementing the present invention. Additionally, it is advantageous that the procedures and mechanisms used in the present invention are directly usable not only in a multi-cell transmission case but also in a (standard or non-CoMP) single-cell transmission case.

The above and still further objects, features and advantages of the invention will become more apparent upon referring to the description and the accompanying drawings.

DESCRIPTION OF PREFERRED EMBODIMENTS

In the following, examples and embodiments of the present invention are described with reference to the drawings. For illustrating the present invention, the examples and embodiments will be described in connection with a communication system which may be based on a 3GPP LTE system where CoMP is used. However, it is to be noted that the present invention is not limited to an application in such a system or environment but is also applicable in other communication systems, connection types and the like, where a multi-cell operation can be conducted, i.e. where one UE may be communicating with several base stations or access node.

A basic system architecture of a communication network may comprise a commonly known architecture comprising a wired or wireless access network subsystem and a core network. Such an architecture comprises one or more access network control units, radio access network elements, access service network gateways or base transceiver stations, such as eNBs, with which a UE is capable to communicate via one or more channels for transmitting several types of data. Furthermore, core network elements such as gateway network elements, policy and charging control network elements and the like are usually comprised. The general functions and interconnections of those elements are known to those skilled in the art and described in corresponding specifications so that a detailed description thereof is omitted herein. However, it is to be noted that several additional network elements and signaling links may be employed for a communication connection to or from UEs, than those described in detail herein below.

Furthermore, the described network elements, such as network nodes like UEs or eNBs (base stations) or the like, as well as corresponding functions as described herein may be implemented by software, e.g. by a computer program product for a computer, and/or by hardware. In any case, for executing their respective functions, correspondingly used devices and network element may comprise several means and components (not shown) which are required for control, processing and communication/signaling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like.

Figure 1:
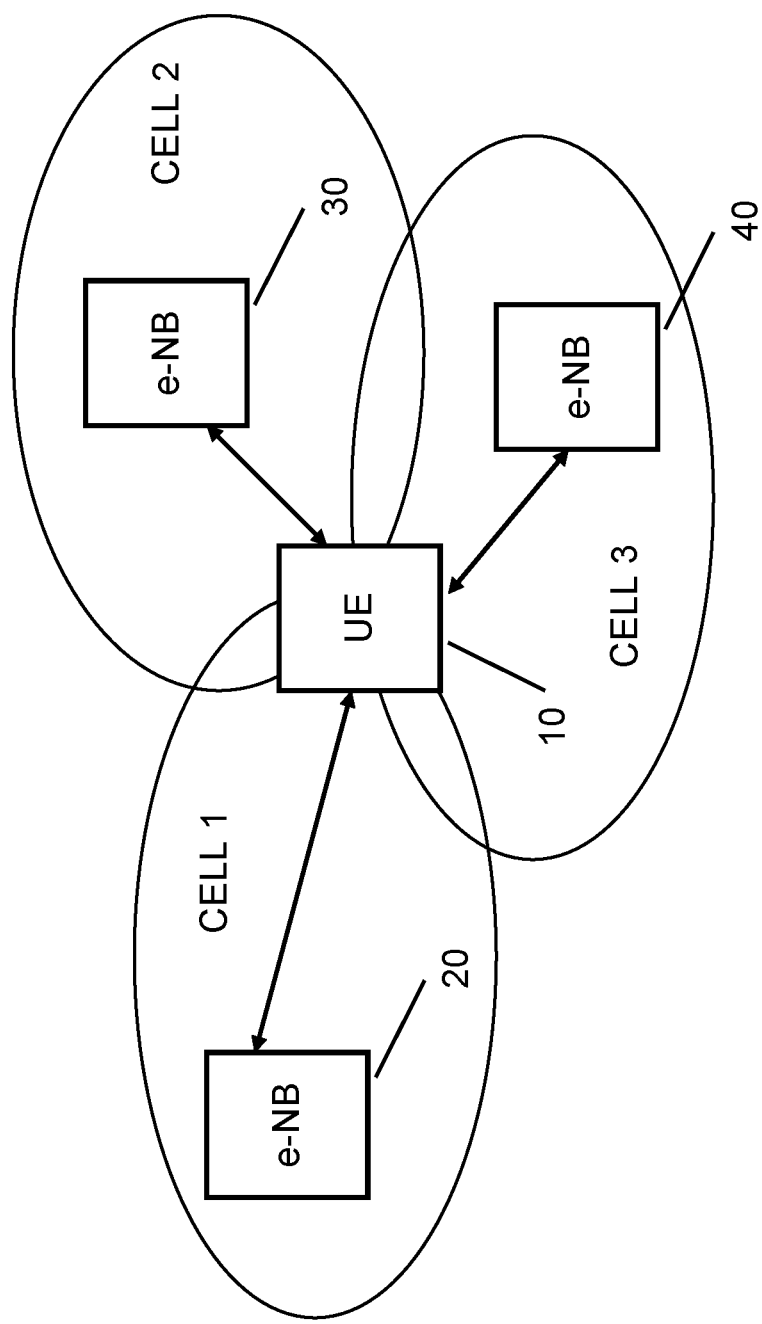
FIG. 1 shows a diagram illustrating a network architecture in which examples of embodiments of the invention are implantable.

In FIG. 1, a simplified architecture of an exemplary communication network is shown for illustrating a scenario where examples of embodiments of the present invention are applicable. Specifically, FIG. 1 shows an 3GPP LTE based communication network configuration where a plurality of base transceiver stations, i.e. eNBs, are provided and a UE 10 is located in a cell edge region where communication with more than one eNB is possible, i.e. where a multi-point transmission and reception scenario according to e.g. CoMP is implemented.

It is to be noted that the network architecture shown in FIG. 1 depicts only those network elements which are useful for understanding the principles of the examples of embodiments of the invention. As known by those skilled in the art there are several other network elements involved in the establishment, control and management of a communication connection which are omitted here for the sake of simplicity.

Referring to FIG. 1, reference sign 10 denotes the UE communicating in a multi-point operation mode. Reference signs 20, 30 and 40 denote a respective eNB as a base transceiver station which provide access for a communication connection in a certain region, also referred to as cell (illustrated by circles around the respective eNB, i.e. cell 1 for eNB 20, cell 2 for eNB 30, cell 3 for eNB 40). For the sake of simplicity, it is assumed that each eNB 20, 30, 40 serves a single cell, but the present invention is not limited to this. Instead, an eNB may serve more than one cell, or may include subcells which are served by own base transceiver stations. Furthermore, the number of eNBs to which the UE 10 can be connected is not limited to three but may be more or less than this number.

According to an example of embodiments of the present invention, it is assumed that the UE 10 is located in a region of a (main) serving cell 1, e.g. the cell of eNB 20, where it is also able to communicate with other eNBs 30 and 40, i.e. to perform a CoMP communication.

As indicated above, when a CoMP communication is established, where the UE 10 is simultaneously connected to eNBs 20, 30, 40, sufficient and accurate CSI reports are to be provided so as to enable the cooperating eNBs 20, 30 and 40 to select optimal precoders and frequency resources for data transmission or to perform joint transmission to the UE simultaneously.

According to an example of embodiments of the present invention, this is achieved in the following manner.

Basically, a multi-cell CSI feedback compression scheme is implemented in the UE which allows the UE 10 to send in a multi-point communication scenario sufficient and accurate CSI reports so that support for capacity improving techniques like FDPS can be provided while the UL overhead is minimized.

Specifically, according to the example of embodiments of the invention, the UE 10 uses a feedback mode for CSI reporting which comprises the following measures.

The UE 10 determines specific frequency subbands of the totality of frequency or communication subbands available for a communication in each cell. These specific subbands provide, for example, a specific communication quality level or the like, such as minimum properties for a communication within the respective cell.

From these subbands, those subbands are selected which are available in several of the cells. In other words, the UE 10 selects subbands (identified, for example, on the basis of a subband number label) which fulfill specific quality limits and which are present in at least two or more of the cells to which the UE 10 can communicate (i.e. in cells 1 to 3). These final set of subbands is also referred to as best M subbands, wherein M is greater than 0.

As criteria for selecting the subbands (or M best subbands) in the cells, the specific communication quality level may mean, for example, that a predetermined number M of subbands is selected from all subbands of the plurality of cells, wherein M>0, wherein these selected M subbands provide relatively best communication quality compared to the remaining subbands. Another alternative for defining the specific communication quality level is, for example, that each subband of all subbands of the plurality of subbands is selected which provide a specific minimum communication quality level. In other words, either the "M" of "M best subbands" is fixed, or the "best" (with regard to the quality level to be achieved at least) is fixed.

According to examples of embodiments of the invention, the value of M and the specific minimum communication quality level can be variably set, i.e. the number M or the minimum quality level may be changed, for example, depending on subscriber specific settings (e.g. based on an status of the subscriber or the like), on load considerations (how is the load situations in the cells, i.e. which quality level or capacity is actually available), and the like. Also a mixed scenario is applicable, for example where the value of the number M is set in accordance with a minimum quality level (the higher the minimum quality level, the lower the number of M subbands), or the like. Furthermore, even when a minimum quality level is considered, as soon as a predetermined number of subbands (such as M) is determined which fulfill this level, the selection for the joint set of subbands may be stopped.

Figure 2:
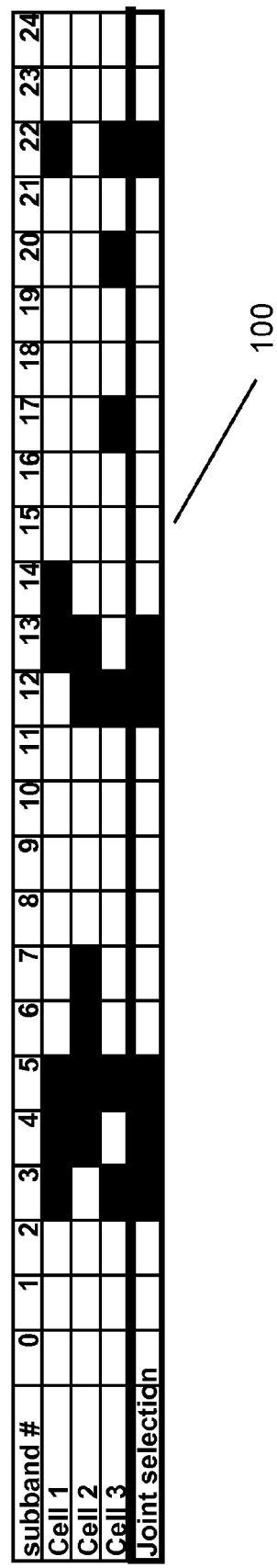
FIG. 2 shows a diagram illustrating a principle of selecting appropriate subbands for determining a joint set of communication subbands according to examples of embodiments of the invention.

FIG. 2 illustrates an example of the basic principle of the example of embodiments of the invention as described above.

In FIG. 1, a table-like diagram 100 is shown which represents all subbands in all cells 1 to 3 to which the UE 10 can be connected, i.e. which are measurable by the UE 10 so as to determine whether they fulfill the minimum requirement for becoming a candidate for the best M cells. Specifically, FIG. 2 shows subbands labeled by number (#) 0 to 24 of cells 1 to 3 (see FIG. 1). Hence, in the upper portion of the table, all subbands are illustrated. The subbands which fulfill the specific communication quality level (i.e. belong to the M subbands with the relatively best quality level (M is fixed), or provide a minimum quality level (M is variable)) or the like are indicated by black boxes, while subbands not providing the minimum level are indicated by white boxes.

In the lower portion of the table, denoted by "joint selection", the subbands (i.e. subband numbers) are indicated by black boxes which are selected as best M subbands, i.e. which are included in a joint set of communication subbands. In the example shown in FIG. 2, these selected best M subbands comprise subbands #3, 4, 5, 12, 13 and 22, i.e. those subbands which are shared by more than one cell as subbands fulfilling the required minimum quality level, for example. That is, the UE 10 identifies jointly the best subbands considering transmission over all the cooperating cells 1 to 3.

When the selection of the best M subbands is finalized, i.e. the joint set of communication subbands is generated, the UE 10 signals to the eNBs 20, 30 and 30 the selection result. This is accompanied by corresponding cell state information, such as CQIs and PMIs of the selected subbands (i.e. those of the joint set of subbands). Furthermore, CQIs and PMIs for all the cooperating cells may be sent. That is, the CSI report may include cell specific information related to quality indicators (CQI/PMI) concerning the respective cells, and/or joint information related to quality indicators (CQI/PMI) considering a joint transmission from all cooperating cells.

That is, according to an example of embodiments of the invention, the UE 10, after selecting the joint set of subbands, performs a CSI reporting towards the eNBs of the CoMP communication and reports, for example, one joint bitmap or a label or a combinatorial index indicating the best M subbands considering all cooperating cells. Furthermore, according to the example of embodiments of the invention, the UE 10 determines and reports for the M best subbands a CQI for each codeword and each cell assuming a transmission from that cell only.

According to a further example of embodiments of the invention, in addition to this, for the M best subbands, the UE 10 may derive a single PMI for each cell assuming a transmission from that cell only. Additionally, for the M best subbands, the UE 10 may also include into the report a CQI for each codeword and a PMI, assuming a simultaneous transmission from all the reported cells using the best M subbands.

In addition to the above information, the CSI report according to examples of embodiments of the invention includes for all the subbands of all cells (i.e. the totality of cells indicated in FIG. 2, for example) a CQI for each codeword and each cell derived by the UE 10 assuming a transmission from that cell only.

According to a further example of embodiments of the invention, in addition to this, for all the subbands of all cells, the UE 10 may derive a single PMI for each cell assuming a transmission from that cell only. Additionally, for all the subbands of all cells, the UE 10 may include into the report a CQI for each codeword, and a PMI assuming a simultaneous transmission from all the reported cells using all the subbands With regard to the CQI included in the report, it is to be noted that according to examples of embodiments of the invention, there may be determined and included either one CQI (4 bits) for a first codeword and one delta CQI (2 bits relative to the CQI of the first codeword) for a second codeword (4+2 bits), or 4 bits CQI for each of the first and second codeword (4+4 bits).

According to a further example of embodiments of the invention, an RI for each cooperating cell and/or an RI considering joint transmission from all the cells may also be reported at the same time.

In addition or alternatively to the above information, the CSI report according to examples of embodiments of the invention may includes a joint quality indicator considering a transmission from all cooperating cells. Furthermore, PMIs considering a joint transmission from all cooperating cells may be added.

In the following, a concrete example of a CSI report containing the compressed information according to above described examples of the invention is given in comparison to an example using a CSI reporting such as the Mode 2-2. It is to be noted that this represent only one example, and other contents or formats may be used as the CSI report than those described in the following.

As described above, according to the examples of embodiments of the present invention, the UE 10 indicates to the eNBs 20, 30, 40 the best subbands jointly over multiple cells. Hence, the report comprises one subband label or the like for all the cells which has a size of e.g. 18 bits. Furthermore, for each cell, when a transmission using the best M subbands is assumed, a CQI with a size of 4 bit, a delta CQI for a 2nd Codeword with a size of 2 bits, a PMI with a size of 4 bits is included in the report. Furthermore, for each of the cell 1 to 3, when a transmission using all the subbands is assumed, a CQI (for all subbands of all cells) with a size of 4 bits, a delta CQI for the 2nd Codeword (for all subbands of all cells) with a size of 2 bits, and a PMI (for all subbands of all cells) with a size of 4 bits is included.

As a result, according to examples of embodiments of the present invention, a total size of the report of:

$$18+(4+2+4+4+2+4)*3=78 \text{ bits}$$

is achievable.

In comparison to this, when a conventional reporting mode, such as the Mode 2-2 for each cell is used, the following result for a total reporting size is achieved.

Assuming a 20 MHz system bandwidth, and 4 TX antennas, as well as a rank=2 transmission (according to the indications given above for the typical Mode 2-2 reporting, the report comprises a subband label of 18 bits. Furthermore, again assuming a transmission using the best M subbands (for the respective cell), the report comprises a CQI of 4 bits, a delta CQI for the 2nd Codeword of 2 bits, and a PMI of 4 bits. In addition, assuming a transmission using all the subbands, the report comprises a CQI of 4 bits, a delta CQI for the 2nd Codeword of 2 bits and a PMI of 4 bits.

Thus, the total size of the report concerning one cell is $$18+4+2+4+4+2+4=38 \text{ bits}$$

Thus, when a situation as indicated in FIG. 1 (and the upper part of FIG. 2) is assumed, where three cells are communicating with the UE 10, there are tree feedback reports (one for each cell) required, which results in a total report size of 3*38 bits=116 bits.

That is, an overhead in the UL direction is reduced by a significant amount, for example in the presented examples by (116−78=) 38 bits which means by 32.8%.

Furthermore, in a reporting mode where plural conventional CSI reports are sent, besides the greater overhead, it is also not guaranteed that the subbands which are selected by the UE are suitable for joint transmission. The UE may point to different subbands in each cell which makes it complicate for the cooperating eNBs to make use of the report with regard to CoMP criterias. Since the examples of the embodiments of the invention indicate the joint set of subbands, it is ensured that the cooperating eNBs can use of the report accordingly.

Regarding the procedure conducted by the UE 10 to select the subbands for the joint set of subbands, i.e. the best M subbands indicated above, several possibilities are conceivable.

One example according to embodiments of the invention for the criteria and the exact procedure/algorithm regarding the way how to select the best M subbands is to identify e.g. a communication quality parameter, such as the SINR for all the subbands 0 to 24 in all the cells 1 to 3 (see example according to FIG. 2), based on e.g. common RS or CSI-RS. Then, the UE 10 performs an estimation processing or the like to determine for which subband the joint SINR would be the highest. This subband is then selected as one of the best M subbands, and indicated in the joint set of communication subbands. Then, based on the selected M subbands, the UE 10 may perform the determination of the elements to be indicated in the report, such as the preferred CQIs and PMIs, which may be done in a known manner and thus not discussed here in detail.

However, it is to be noted that the way to select the best M subbands is not limited to the above described example. Many different examples may be used, as long as it is ensured that the selected M subbands provide the necessary performance (i.e. the minimum quality level) as implied by the CQI part of the report (for example, 10% BLER shall not be exceeded for the reported CQI/MCS/TBS).

Figure 3:
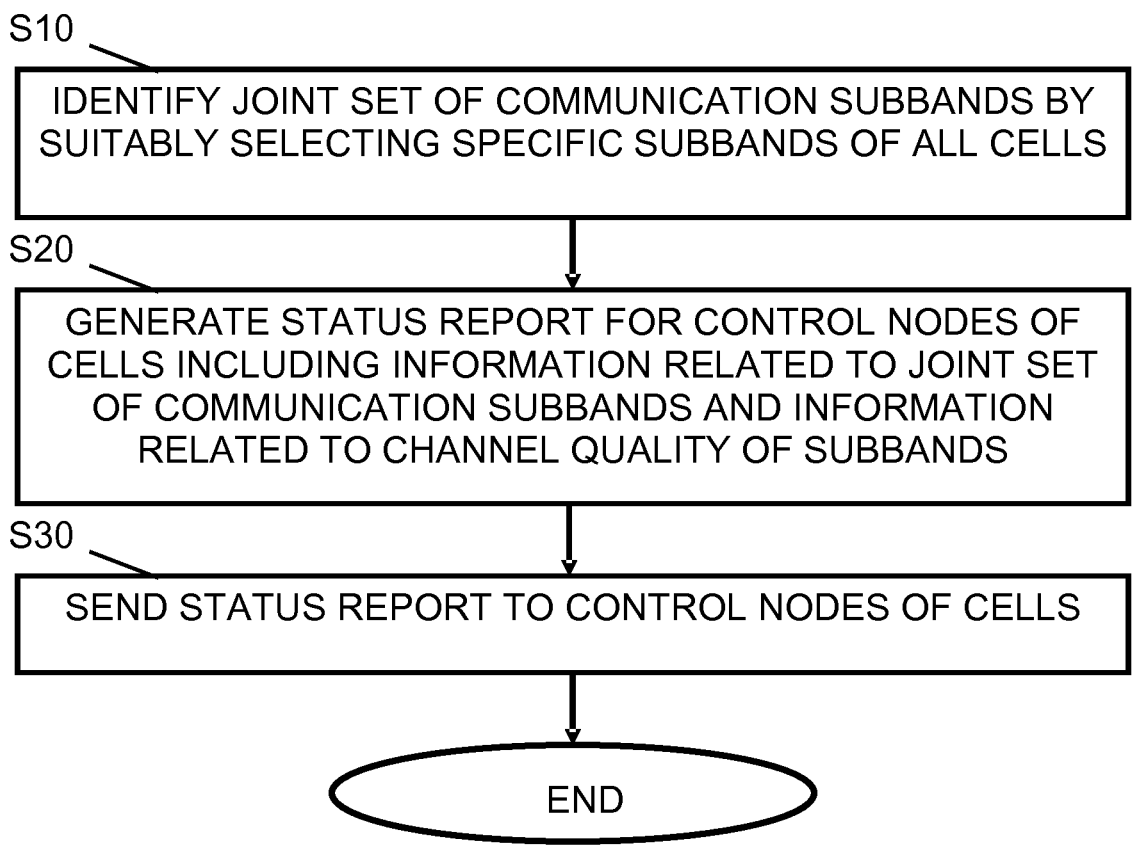
FIG. 3 shows a flowchart illustrating a procedure executed in a network element such as a UE conducting a CSI reporting according to examples of embodiments of the invention.

Next, referring to FIG. 3, a flowchart illustrating a procedure executed in a network element such as the UE 10 according to examples of embodiments of the invention is described for explaining the feedback reporting according to example of embodiments of the present invention. The processing according to FIG. 3 corresponds to a processing conducted in the UE 10 according to FIG. 1, considering a scenario as indicated in FIG. 2, for example.

In step S10, first, the UE 10 identifies a joint set of communication subbands of the plurality of cells with which the UE can communicate. That is, the UE 10 identifies the best M subbands as described in connection with FIG. 2, for example. In other words, the joint set of communication subbands includes the best M subbands of all available subbands which provide a predetermined communication quality level (a minimum level), and which are common to at least two of the cells.

In step S20, the UE 10 generates a status report, such as a CSI report, as indicated above. The status report may comprise several information, at least an information regarding the joint set of communication subbands, cell specific information and/or joint information, comprising for example a (first) quality indicator (CQI) for each cell assuming a transmission using the best M subbands, and a (second) quality indicator (CQI) for each of the cells related to a transmission using all subbands, etc. As indicated above, the status report may comprise several further information.

Then, in step S30, the UE 10 sends the generated status report to the eNBs 20, 30, 40, for example.

Figure 4:
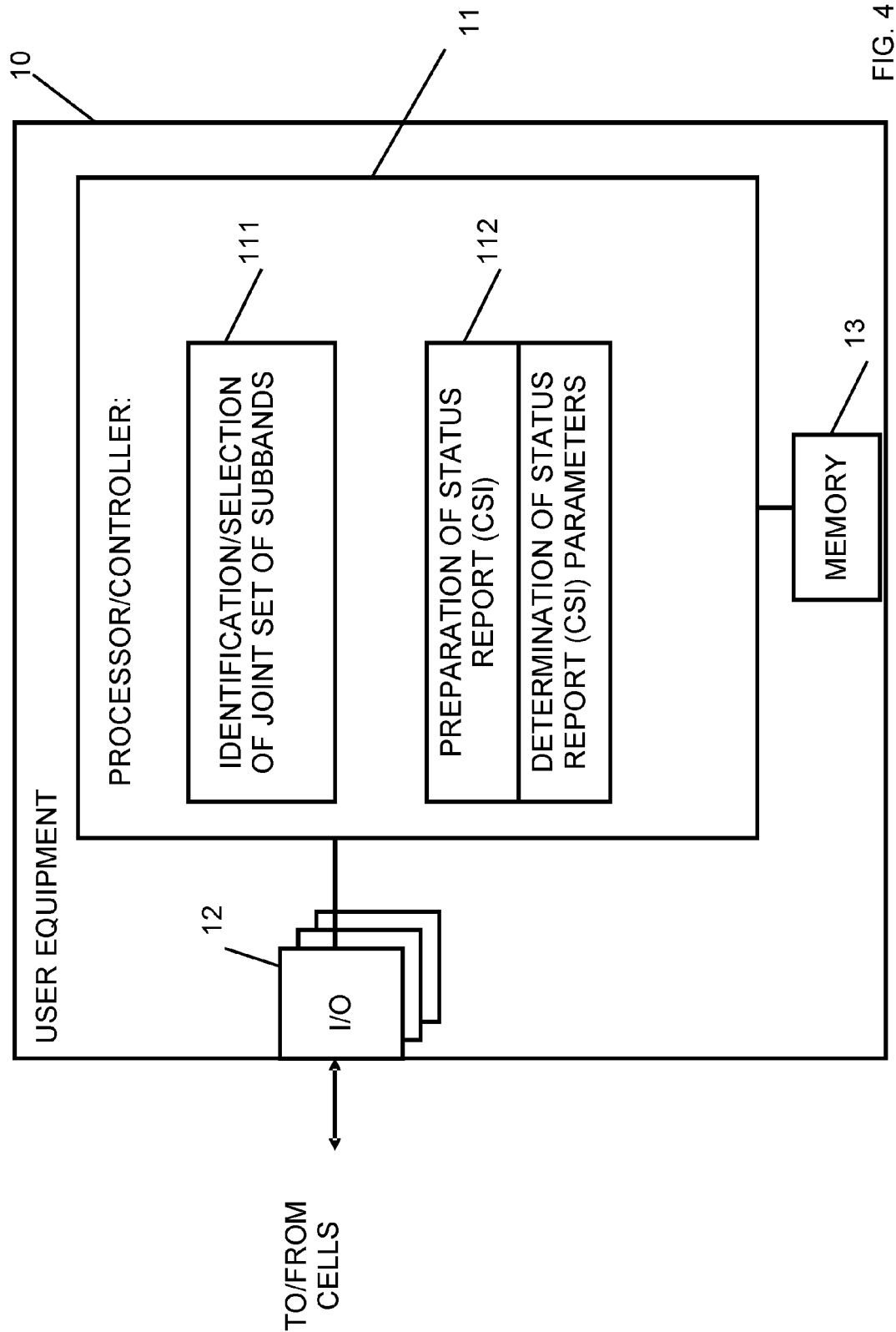
FIG. 4 shows a block circuit diagram illustrating a configuration of a network element such as a UE according to examples of embodiments of the invention.

FIG. 4 shows a block circuit diagram illustrating a configuration of a network element, such as the UE 10, which is configured to implement the processing as described in connection with FIG. 3. It is to be noted that the network element or UE 10 shown in FIG. 4 may comprise several further elements or functions besides those described herein below, which are omitted herein for the sake of simplicity as they are not essential for understanding the invention.

The UE 10 may comprise a processing function or processor 11, such as a CPU or the like, which executes instructions given by programs or the like related to the power control. The processor 11 may comprise further portions dedicated to specific processings as described below. Portions for executing such specific processings may be also provided as discrete elements or within one or more further processors, for example. Reference signs 12 denote transceiver or input/output (I/O) units connected to the processor 11. The I/O units 12 may be used for communicating with other network element, such as the eNBS 20, 30 and 40 according to FIG. 1. The I/O units 12 may be a combined unit comprising communication equipment towards several of the network elements in question, or may comprise a distributed structure with a plurality of different interfaces for each network elements in question. Reference sign 13 denotes a memory usable, for example, for storing data and programs to be executed by the processor 11 and/or as a working storage of the processor 11.

The processor 11 is configured to execute processings related to the connection control described above. In particular, the processor 11 comprises a sub-portion 111 which is usable for identifying and selecting the subbands forming the joint set of subbands (e.g. in accordance with step S10 described in FIG. 3). Furthermore, the processor 11 comprises a sub-portion 112 which is related to a processing for generating and sending the status report towards the eNBs 20, 30, 40 (via the I/O units 12), which processing comprises the determination of the status report parameters (such as CQI, PMI) and the formation of the status report itself.

While the above described examples of embodiments of the invention are related to a communication scenario using CoMP communication as shown in FIG. 1, where each cell is served by a different eNB, there are also other CoMP based scenarios where the present invention is applicable in a similar manner. For example, so-called intra-site CoMP scenarios are possible where one eNB entity serves more than one cell. Also cells having a distributed subcells, such as micro-cells served by Home-eNBs or the like are known where the principles of the solutions described above are applicable.

According to further examples of embodiments of the invention, there is provided an apparatus comprising a first processing means for identifying a joint set of communication subbands of a plurality of cells with which a user equipment can communicate, wherein the joint set of communication subbands includes those subbands which provide a specific communication quality level, and which are common to at least two of the plurality of cells, and a second processing means for generating a status report and for initiating a transmission of the status report to control nodes of each of the plurality of cells, wherein the status report comprises an information regarding the joint set of communication subbands, and at least one of cell specific information comprising a first quality indicator for each cell of the plurality of cells related to a transmission using the subbands of the respective cell included in the joint set of communication subbands, and a second quality indicator for each cell of the plurality of cells related to a transmission using all subbands of the respective cell, and/or joint information comprising a joint quality indicator related to a transmission using all cells.

For the purpose of the present invention as described herein above, it should be noted that

- an access technology via which signaling is transferred to and from a network element or node may be any technology by means of which a node can access an access network (e.g. via a base station or generally an access node). Any present or future technology, such as WLAN (Wireless Local Access Network), WiMAX (Worldwide Interoperability for Microwave Access), LTE, BlueTooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto,
- usable access networks and transmission nodes may be any device, apparatus, unit or means by which a station, entity or other user equipment may connect to and/or utilize services offered by the access network; such services include, among others, data and/or (audio-) visual communication, data download etc.;
- a user equipment may be any device, apparatus, unit or means by which a system user or subscriber may experience services from an access network, such as a mobile phone, personal digital assistant PDA, or computer;
- method steps likely to be implemented as software code portions and being run using a processor at a network element or terminal (as examples of devices, apparatuses and/or modules thereof, or as examples of entities including apparatuses and/or modules for it), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

As described above, there is proposed a mechanism allowing a compressed multi-cell channel state information feedback. In a user equipment communicating with plural base stations such as eNBs, a joint set of communication subbands is identified which includes those subbands which provide a specific communication quality level, and which are common to at least two of the plural cells. Then, a status report is generated and transmitted to the control nodes of each of the plural cells. The status report comprises an information regarding the joint set of communication subbands, cell specific information comprising quality indicators for each cell of the plurality of cells related to a transmission using the subbands of the respective cell included in the joint set of communication subbands and quality indicators for each cell of the plurality of cells related to a transmission using all subbands of the respective cell, and joint information concerning a joint quality indicator related to a transmission using all cells.

Although the present invention has been described hereinbefore with reference to particular embodiments thereof, the present invention is not limited thereto and various modifications can be made thereto.

The invention claimed is:

1. An apparatus, comprising:
at least one processor; and
at least one memory including computer program code, where the at least one memory and the computer program code are configured, with the at least one processor, to cause the apparatus to at least:
identify a joint set of communication subbands by jointly considering transmissions over a plurality of cells with which a user equipment can perform a communication, wherein the joint set of communication subbands includes those subbands which provide a specific communication quality level, and which are common to at least two of the plurality of cells, and
generate a status report, wherein the status report comprises information regarding the joint set of communication subbands, and at least one of:
cell specific information comprising a first quality indicator for each cell of the plurality of cells related to a transmission using the subbands of the respective cell included in the joint set of communication subbands, and a second quality indicator for each cell of the plurality of cells related to a transmission using all subbands of the respective cell, and
joint information comprising a joint quality indicator related to a simultaneous transmission using all cells, over the joint set of communication subbands; and
transmit the status report to control nodes of each of the plurality of cells for use to perform the communication over one or more of the plurality of cells.

2. The apparatus according to claim 1, wherein the at least one memory including the computer program code is configured with the at least one processor to cause the apparatus to identify the joint set of communication subbands of the plurality of cells with which the user equipment can perform the communication is further configured
to detect in each subband of each of the plurality of cells at least one transmission quality parameter, and
to determine on the basis of the detected transmission quality parameter those subbands which provide the specific communication quality level.

3. The apparatus according to claim 1, wherein the specific communication quality level is based on at least one of
a predetermined number M of subbands from all subbands of the plurality of cells, wherein M>0, providing the relatively best communication quality level compared to the remaining subbands, and
those subbands of all subbands of the plurality of cells providing a specific minimum communication quality level.

4. The apparatus according to claim 1, wherein the at least one memory including the computer program code is configured with the at least one processor to cause the apparatus to determine for at least one of the cell specific information and the joint information one of:
a channel quality indication for a first codeword and a delta channel quality indication for a second codeword, and
a channel quality indicator for each of a first and second codeword.

5. The apparatus according to claim 1, wherein the at least one memory including the computer program code is configured with the at least one processor to cause the apparatus to determine and include in the status report at least one of:
a first precoding matrix indication for each cell of the plurality of cells related to a transmission using the subbands of the respective cell included in the joint set of communication subbands, a second precoding matrix indication for each cell of the plurality of cells related to a transmission using all subbands of the respective cell,
a third precoding matrix indication considering a joint transmission from all cells,
a rank indicator for each cooperating cell, and
a rank indicator considering a joint transmission from all cells.

6. The apparatus according to claim 1, wherein the at least one memory including the computer program code is configured with the at least one processor to cause the apparatus to introduce in the status report as the information regarding the joint set of communication subbands one of a joint bitmap, a label or a combinatorial index indicating the subbands included in the joint set of communication subbands.

7. The apparatus according to claim 1, wherein the apparatus is implemented in a user equipment configured to communicate with each of the plurality of cells.

8. A method comprising
identifying, by a user equipment, a joint set of communication subbands by jointly considering transmission over a plurality of cells with which the user equipment can perform a communication,
wherein the joint set of communication subbands includes those subbands which provide a specific communication quality level, and which are common to at least two of the plurality of cells; and
generating, by the user equipment, a status report, wherein the status report comprises information regarding the joint set of communication subbands, and at least one of
cell specific information comprising a first quality indicator for each cell of the plurality of cells related to a transmission using the subbands of the respective cell included in the joint set of communication subbands, and a second quality indicator for each cell of the plurality of cells related to a transmission using all subbands of the respective cell, and
joint information comprising a joint quality indicator related to a transmission using all cells; and
transmitting, by the user equipment, the status report to control nodes of each of the plurality of cells for use to perform the communication over one or more of the plurality of cells.

9. The method according to claim 8, wherein the identification of the joint set of communication subbands of the plurality of cells with which the user equipment can communicate further comprises:
detecting in each subband of each of the plurality of cells at least one transmission quality parameter; and
determining on the basis of the detected transmission quality parameter those subbands which provide the specific communication quality level.

10. The method according to claim 8, wherein the specific communication quality level is based on at least one of
a predetermined number M of subbands from all subbands of the plurality of cells, wherein M>0, providing the relatively best communication quality level compared to the remaining subbands, and
those subbands of all subbands of the plurality of cells providing a specific minimum communication quality level.

11. The method according to claim 8, wherein the generation of the status report further comprises one of:
determining for the cell specific information and/or the joint information
a channel quality indication for a first codeword and a delta channel quality indication for a second codeword, and
a channel quality indication for each of a first and second codeword.

12. The method according to claim 8, wherein the generation of the status report further comprises:
determining and including in the status report at least one of:
a first precoding matrix indication for each cell of the plurality of cells related to a transmission using the subbands of the respective cell included in the joint set of communication subbands;
a second precoding matrix indication for each cell of the plurality of cells related to a transmission using all subbands of the respective cell;
a third precoding matrix indication considering a joint transmission from all cells;
a rank indicator for each cooperating cell; and
a rank indicator considering a joint transmission from all cells.

13. The method according to claim 8, wherein the generation of the status report further comprises
introducing in the status report as the information regarding the joint set of communication subbands one of a joint bitmap, a label or a combinatorial index indicating the subbands included in the joint set of communication subbands.

14. The method according to claim 8, wherein the user equipment is configured to communicate with each of the plurality of cells.

15. A non-transitory computer readable medium encoded with a computer program product executable by a processor to perform operations comprising:
identifying a joint set of communication subbands by jointly considering transmission over a plurality of cells with which a user equipment can perform a communication,
wherein the joint set of communication subbands includes those subbands which provide a specific communication quality level, and which are common to at least two of the plurality of cells; and
generating a status report, wherein the status report comprises information regarding the joint set of communication subbands, and at least one of cell specific information comprising a first quality indicator for each cell of the plurality of cells related to a transmission using the subbands of the respective cell included in the joint set of communication subbands, and a second quality indicator for each cell of the plurality of cells related to a transmission using all subbands of the respective cell, and joint information comprising a joint quality indicator related to a transmission using all cells; and
transmitting the status report to control nodes of each of the plurality of cells for use to perform the communication over one or more of the plurality of cells.

16. The non-transitory computer readable medium according to claim 15,
wherein said computer program product is directly loadable into the non-transitory computer readable medium by means of at least one of upload, download and push procedures.

17. The non-transitory computer readable medium according to claim 15, wherein the identifying the joint set of communication subbands of the plurality of cells with which the user equipment can communicate further comprises:
detecting in each subband of each of the plurality of cells at least one transmission quality parameter; and determining on the basis of the detected transmission quality parameter those subbands which provide the specific communication quality level.

18. The non-transitory computer readable medium according to claim 15, wherein the specific communication quality level is based on at least one of
    a predetermined number M of subbands from all subbands of the plurality of cells, wherein M>0, providing the relatively best communication quality level compared to the remaining subbands, and
    those subbands of all subbands of the plurality of cells providing a specific minimum communication quality level.

19. The non-transitory computer readable medium according to claim 15, wherein the generation of the status report further comprises one of:
    determining for the cell specific information and/or the joint information
    a channel quality indication for a first codeword and a delta channel quality indication for a second codeword, and
    a channel quality indication for each of a first and second codeword.

20. The non-transitory computer readable medium according to claim 15, wherein the generation of the status report further comprises:
    determining and including in the status report at least one of:
    a first precoding matrix indication for each cell of the plurality of cells related to a transmission using the subbands of the respective cell included in the joint set of communication subbands;
    a second precoding matrix indication for each cell of the plurality of cells related to a transmission using all subbands of the respective cell;
    a third precoding matrix indication considering a joint transmission from all cells;
    a rank indicator for each cooperating cell; and
    a rank indicator considering a joint transmission from all cells.

* * * * *